United States Patent [19]

Falcioni

[11] 4,245,921

[45] Jan. 20, 1981

[54] CONTINUOUSLY CURVED COUNTERSINK USED WITH DEFORMABLE RIVET

[75] Inventor: Joseph G. Falcioni, Tacoma, Wash.

[73] Assignee: The Boeing Company, Seattle, Wash.

[21] Appl. No.: 865,933

[22] Filed: Dec. 30, 1977

Related U.S. Application Data

[63] Continuation-in-part of Ser. No. 755,834, Dec. 30, 1976, Pat. No. 4,111,580.

[51] Int. Cl.$^3$ .................. F16B 19/06; B25G 3/00; F16D 1/00; F16G 11/00
[52] U.S. Cl. ................... 403/408; 403/388; 411/504
[58] Field of Search .............. 85/37, 9 R, 1 R; 403/388, 408, 284, 285, 281; 29/509

[56] References Cited

U.S. PATENT DOCUMENTS

| | | | |
|---|---|---|---|
| 2,957,237 | 10/1960 | Regle et al. | 85/37 UX |
| 3,526,032 | 9/1970 | Pipher | 85/37 X |
| 3,747,467 | 7/1973 | Rosman | 85/37 |
| 3,936,205 | 2/1976 | Speakman | 85/37 X |
| 4,111,580 | 9/1978 | Falcioni | 403/388 X |

Primary Examiner—James Kee Chi
Attorney, Agent, or Firm—Christensen, O'Connor, Johnson & Kindness

[57] ABSTRACT

A fastening system having a continuously curved countersink section in an aperture through a plurality of workpieces, with a corresponding rivet having a continuously curved head portion substantially congruent to the continuously curved countersink. Rivets equipped with the continuously curved head surfaces taught herein, when mated with a continuously curved countersink, provide sufficient resistance to fastener pull through, cause cold working of the rivet upon insertion of the rivet into the aperture and impose an elastic load upon the workpiece and rivet, strengthening the joint.

8 Claims, 6 Drawing Figures

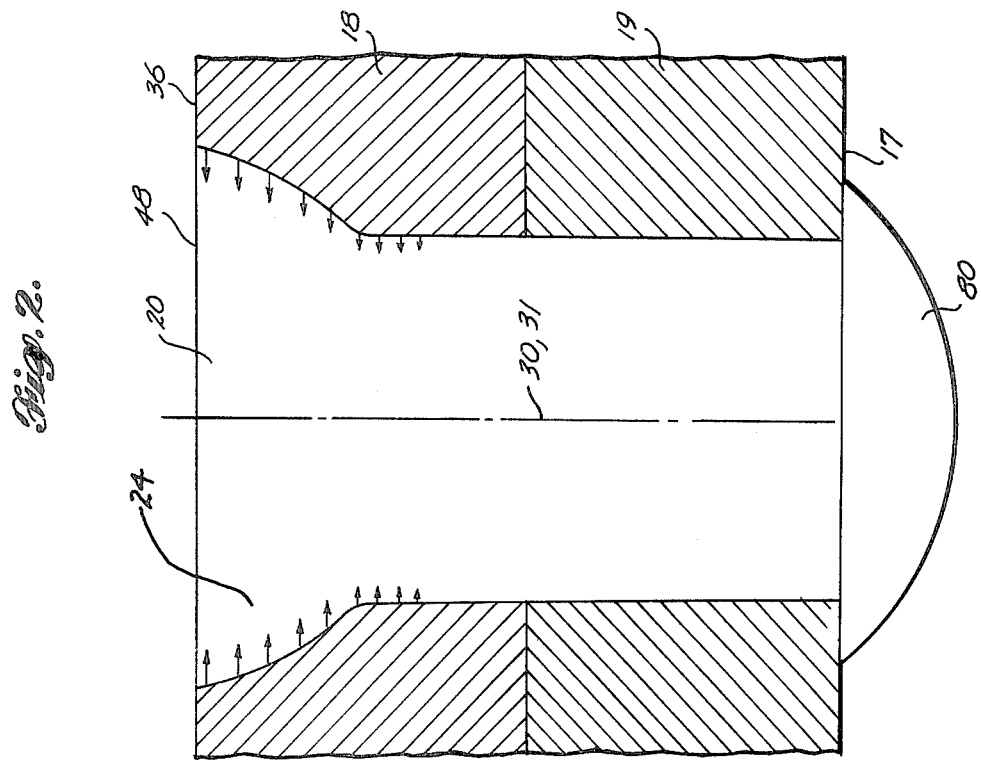
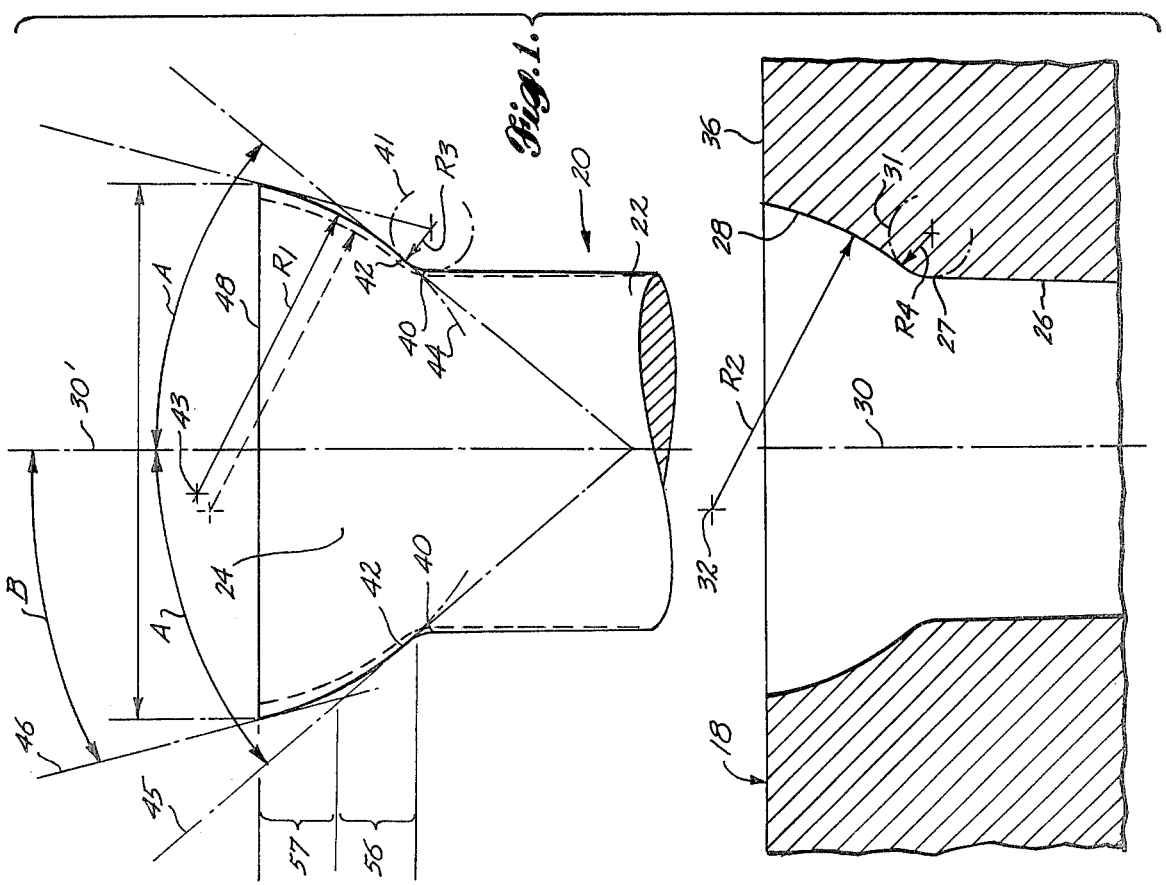

CONTINUOUSLY CURVED COUNTERSINK USED WITH DEFORMABLE RIVET

This application is a continuation-in-part of application Ser. No. 755,834, filed Dec. 30, 1976, now U.S. Pat. No. 4,111,580.

BACKGROUND OF THE INVENTION

This invention relates to means for fastening workpieces together utilizing rivets with formable ends having continuously curved head portions insertable into bores having substantially congruent continuously curved countersinks.

PRIOR ART

In the fastening of metal workpieces together with rivets, bolts and pin fasteners, the necessity of interference in the countersink area has been demonstrated by extensive testing and experience in the aerospace industry. Countersink structures having diverging angles of 82° and 100° have been found to be associated with numerous fatigue failures, originating in the countersinks, The geometry of these countersink structures is such that the fastener inserted therein cannot impart a sufficient wedging force (interference) to the material at the countersink. As a result, a condition is present that allows infiltration of moisture and foreign materials between the rivet and the countersink. Corrosion results. Efforts have been made to solve the problem of corrosion by the addition of a thick paint coating to isolate the exterior surface of the workpieces from the elements. However, this protection is lost if a break occurs in the paint near the countersink area, allowing infiltration of moisture and foreign materials. Since the typical 82° and 100° fasteners frequently permit working between the material and the fastener, such breaks readily occur. Furthermore, the application of protective paint surfaces adds substantially to the deadweight of an airplane or other structure, resulting in loss of performance and high fuel consumption. In the instance of an aircraft, the structures which utilize rivets, bolts and pin-fasteners are constantly under the cyclic influence of temperature, atmospheric pressure, dynamic stresses and moisture. As a result, a crack in the paint can initiate a corrosion nucleus. From the initiation of this nucleus and upon continued cyclic influences as mentioned, corrosion which may be visually concealed can spread to large areas, both at the interface of the paint and the fasteners and at countersink boundary. Catastrophic failure due to stress corrosion may occur. Countersinks having a discontinuous surface also present location of stress concentration and tend to harbor foreign matter.

The high fatigue squeeze riveting process shown in my U.S. Pat. No. 3,874,070 aids in resolving certain of the shortcomings of the prior art rivets. The disclosure of U.S. Pat. No. 3,874,070 is incorporated herein by reference as if fully set forth. While improved rivet performance and joint strength is obtained by my prior squeeze riveting process, there remains the problem of stress concentrations at the discontinuously angled zones of the countersink and uneven cold working of the rivet across the head thereof with resultant uneven hoop stresses imposed upon various zones of the countersink. The continuously curved countersink and rivet structure taught herein is ideally suited for use in the process of U.S. Pat. No. 3,874,070 as well as other conventional riveting processes.

OBJECTS OF THE INVENTION

It is one object of this invention to provide a continuously curved countersink structure and a continuously curved rivet head structure which obtains a sufficient working of the rivet head material within the countersink to obtain structural integrity, yet provides resistance to pull-through of the rivet when installed.

An additional object of this invention is to provide a fastening system for fastening workpieces together which uses a continuously curved interface surface between the rivet and the countersink which prevents stress concentrations and avoids inclusion of foreign matter between the countersink and the rivet.

It is a further object of this invention to provide a rivet fastener system which achieves a selectively controlled interference fit with all or part of the areas of a countersink and bore in the fastening system.

It is a further object of this invention to provide a fastening system having superior corrosion and stress resistance.

It is a still further object of this invention to provide a fastening system comprising workpieces and a rivet which prevents stress corrosion in the assembled structure by achieving a controlled laminar interference pattern in the material surrounding the countersink and in the rivet itself.

It is a specific object of this invention to provide a continuously curved countersink and a corresponding, substantially congruent, rivet fastener structure which is inexpensive to manufacture and which obtains superior corrosion resistance and fatigue life in the assembled parts.

SUMMARY OF THE INVENTION

A fastening system is disclosed comprising a workpiece having an aperture therethrough including a countersink having a continuous curve from the bore to the surface and a corresponding rivet having a head structure which is continuously curved from the shank to the end of the head. The countersink is defined by a surface of revolution, the generatrix of which comprises a continuously curved line extending from the bore of the workpiece, defining a continuous curve from the interior of the workpiece to the surface thereof. One preferred form of the countersink may be defined by rotation of a line comprising arcs of two circles about a line substantially coincident with the axis of the bore, the first arc being tangent to the bore through the workpiece and positioned interiorly of the edge thereof, and the second circle being tangent to the first circle and intersecting the edge of the workpiece. Curves other than circles may be used. Other embodiments of this invention may be formed by having the line about which the generatrix is rotated being angled from or skewed with respect to the axis of the bore, so long as a continuous, smooth curve is attained from the bore to the surface. Sections of parabolas, ellipses and other smooth curves may be used as the generatrix without deviating from the applicant's invention. A corresponding smooth, curved structure is formed on the heads of the rivets utilized in conjunction with the continuous countersink. A portion of the countersink near the bore which is flared outwardly from the axis of the bore provides resistance to pull-through of the rivet. The portion of the countersink near the surface of the workpiece is contoured more nearly parallel to the axis thereof so that the interference fit necessary to induce hoop stresses and improve stress corrosion resistance, as well as to obtain the desired seal, is obtained as the rivet head is deformed during assembly. Both elastic load on the workpiece and rivet and controlled laminar interference pattern in the cold worked rivet material are obtainable in a properly designed fastener and rivet system.

While in most workpiece-rivet systems for forming riveted joints the rivet is deformed and the workpiece substantially undeformed due to the relatively harder workpiece material, it is desirable in this invention to utilize materials for the rivet and workpiece which permits a portion of the deformation necessary to join the workpieces by riveting to occur in the workpiece bore, that is, to have deformation both in the rivet and the workpiece. This advantageous arrangement causes cold work hardening of the metal in both the rivet and adjacent workpiece material as the rivet is upset.

These and other aspects of this invention will be more readily apparent upon an examination of the description which follows and the appended drawings referred to therein.

BRIEF DESCRIPTION OF THE DRAWINGS

FIG. 1 shows a partial side elevation of a rivet having the head structure taught by this invention shown therein, positioned above and in exploded view with respect to an aperture in a workpiece having a continuously curved countersink at one end of the aperture to receive the rivt.

FIG. 2 shows a cross section of an assembled joint structure using the continuously curved countersink in conjunction with a rivet having a continuously curved head structure. The rivet is shown in relief.

DETAILED DESCRIPTION OF THE PREFERRED EMBODIMENTS

Figure 3:
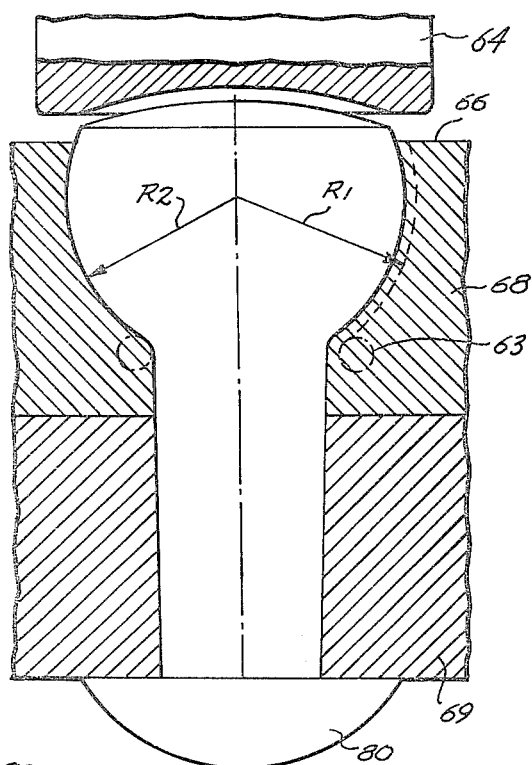
FIG. 3 shows a cross section of a joint structure wherein a rivet, in relief, and countersink are shown formed with surfaces defined by a generatrix comprising segments of two circles, the upper circle having its center positioned below the workpiece surface.

Referring specifically to FIG. 1, there is shown in an exploded view a rivet fastener 20 having a head structure particularly adapted to be inserted within a continuously curved countersink formed in a workpiece and a workpiece 36 so fashioned with a continuously curved countersink 28. The rivet 20 is comprised of a shank portion 22 and an enlarged head portion 24. Shank 22 may either be straight or tapered with respect to the longitudinal axis thereof. An interference fit is preferably formed along the length of bore portion 26 of the workpiece 18. In the preferred embodiment shown in FIGS. 1 and 2, the countersink 28 is a surface described by the rotation of a curved generatrix about the axis 30.

In FIG. 1, the generatrix for the countersink 28 is formed of segments of two circles, the first circle 31 being a small diameter circle positioned at the base of countersink 28 having a radius $R_4$. Circle 31 is located within the workpiece 18 and is positioned tangent to bore 26 at point 27. The second segment of the generatrix is formed of a second circle having a radius $R_2$ measured from center 32 and which is tangent to circle 31 at point 34. The countersink surface is defined by rotation of the above-described generatrix about axis 30. The resultant countersink 28 is a smooth, curved surface extending from the bore 26 to the surface 36 of the workpiece 18.

The exterior surface of the head of rivet 20 is formed in a shape slightly larger than and substantially congruent to the above-described countersink shape. The shape is defined by rotation of a generatrix formed of two curved segments, the first segment being circle 41, having a radius $R_3$. Circle 41 is tangent to shank 22 at tangency point 40. The circle 41 also has point of tangency at 42 to a second, larger diameter circle 44 having a radius $R_1$. Circle 44 is the second curved segment of the generatrix. The fastener head is described by the surface generated by rotation of the above-described generatrix about axis 30'. A line 45 is drawn tangent to the point of tangency between circle 44 and circle 41 lies at an angle A of approximately 41° with respect to the axis 30'. The line 46 drawn tangent to circle 44 at the intersection of circle 44 with fastener-end 48 lies at an angle B of approximately 15° with respect to axis 30'.

The radii $R_1$ and $R_2$ and the location of centers 32 and 43 are chosen so that an interference fit of from about 0.004 to 0.015 inches and preferably from about 0.008 to 0.012 inches is obtained at the surface 36 of workpiece 18 when the fastener 20 is fully installed within workpiece 18. Similarly, the radii and center locations of circles 31 and 41 are chosen so that an interference fit of from 0 to 0.010 inches and preferably from 0.004 to 0.008 occurs between shank 22 and bore 26 when the fastener is fully inserted into workpiece 18. This interference fit is obtained by deformation of fastener or deformation of both fastener and workpiece.

In FIG. 2, a completed structural joint is shown joining workpieces 18 and 19 together by means of a continuous curved head rivet 20. Rivet 20 has an upset or peened end with head 80 formed tightly against surface 17 of workpiece 19. This structure may be easily formed by the method of U.S. Pat. No. 3,874,070. Head 24 of rivet 20 is shown pressed into workpiece 18 so that surface 48 is flush with surface 36. In this embodiment, the rivet 20 and the bore of the aperture through the workpieces are coaxial on axes 30–30'. Forcible insertion of the rivet 20 causes a certain amount of the material of rivet 20 to be displaced in a direction perpendicular to axes 30–30' as shown by the small arrows. This interference, preferably in the form of a controlled laminar interference pattern, causes residual stresses to be set up in both the rivet and the workpiece material adjacent the bore, inducing hoop stresses which strengthen the workpiece structure. When an aluminum rivet is used with an aluminum workpiece, deformation of 0.004 to 0.005 inches is typical for rivets having a shank diameter of about 0.2 to 0.4 inches.

The rivet as shown in FIGS. 1 and 2, having a smooth exterior surface in the form of a continuously curved head as shown, is conveniently pressed into the countersink until the zone 56 resists further entrance of the rivet 20 into the aperture through workpieces 18 and 19.

Zone 56, being an outwardly flared portion of head 24, provides sufficient resistance to pull-through of the rivet 20 and is located so that, upon forcible insertion of rivet 20, the surfaces 48 and 36 are substantially coplanar as shown in FIG. 2. The portion of the head shown approximately at zone 57 is contoured so that the portion adjacent surface 48 approaches perpendicularity with respect to surface 48. Forcing rivet 20 into workpiece 18 causes inward radial displacement of the rivet material adjacent zone 57 and outwardly directed displacement of the adjacent workpiece material. Hoop stresses are set up in the workpiece material surrounding the countersink and in the rivet head. The resulting structure is substantially strengthened thereby.

FIG. 3, a "captured" type of rivet and countersink structure is shown. In these figures, the symbol $R_1$ is used to denote the radius of the upper portion of the generatrix describing the fastener head prior to insertion into the workpiece aperture, while $R_2$ is utilized to denote the radius of the upper portion of the countersink. The fastener in FIG. 3 is shown captured within the workpieces 68 and 69 and the center of the upper arc of the generatrix is shown positioned on the axis 61 below surface 66. A smaller circle 63 is shown forming the portion of the generatrix tangent to both the shank of the fastener and the upper portion of the generatrix. in FIG. 3, the centers of the generatrices for both the countersink and the rivet head are shown coincident. As a result, the interference between rivet 62 and workpiece 68 will be substantially equal over the entire surface of the head of rivet 62.

Die 64 having a cup-shaped rivet-engaging surface is preferably used for the captured type of rivet structure to encourage flow of the rivet materials at the periphery of the rivet to adequately fill the countersink. The shape of the die shown causes the peripheral areas of the rivet to deform first, which in turn enchances the filling of the concave cavity of the continuously curved countersink.

Figure 4:
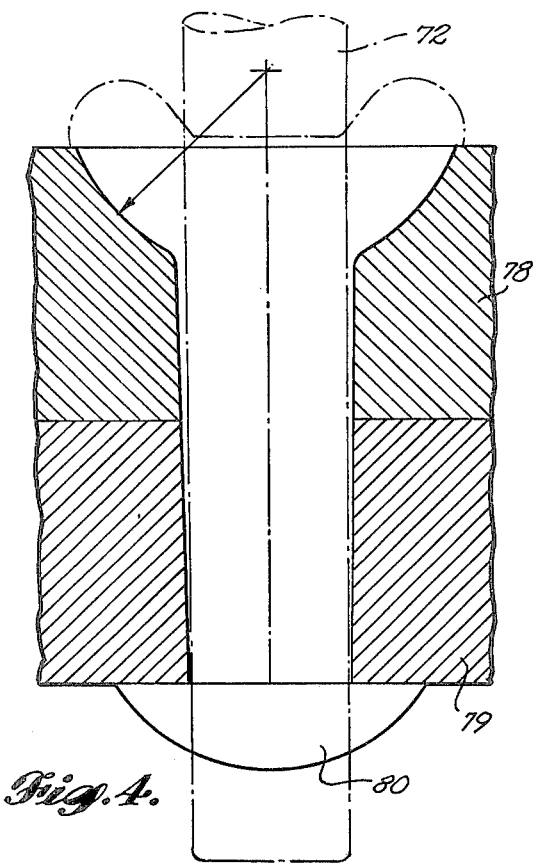
FIG. 4 shows a device similar to that shown in FIG. 3 wherein the center of the upper circle forming the generatrix for the countersink is positioned above the surface of the workpiece.
Figure 5:
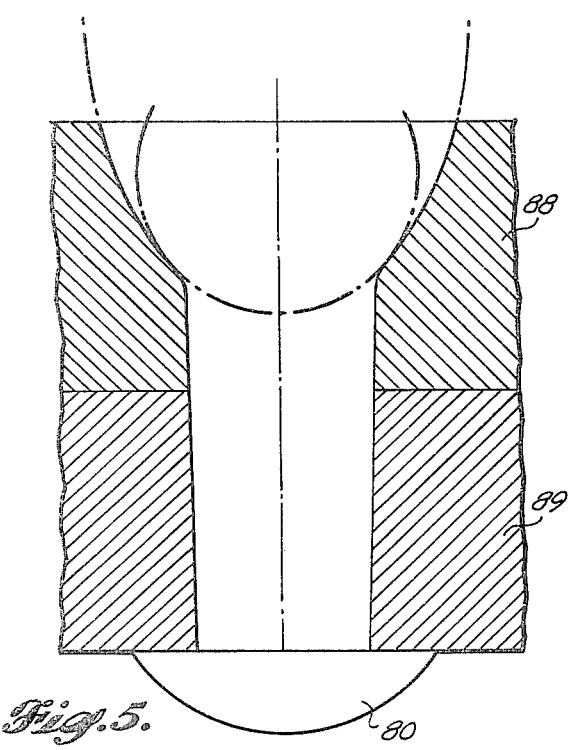
FIG. 5 shows a cross-sectional view of a structural joint wherein the generatrix of the countersink is a section of an ellipse.

In FIG. 4, the center of the circle forming the upper portion of the generatrix of the workpiece aperture is positioned above the surface of the workpiece. In FIG. 5, the generatrix of the countersink is comprised of a section of a hyperbola. Other smooth, curved segments such as a section of an ellipse may be used. The rivet used in this invention may have a substantial taper along its length so that an interference fit may be conveniently formed along the entire length of the bore through the workpieces. Alternatively, the fastener, the bore or both may be cylindrical.

Figure 6:
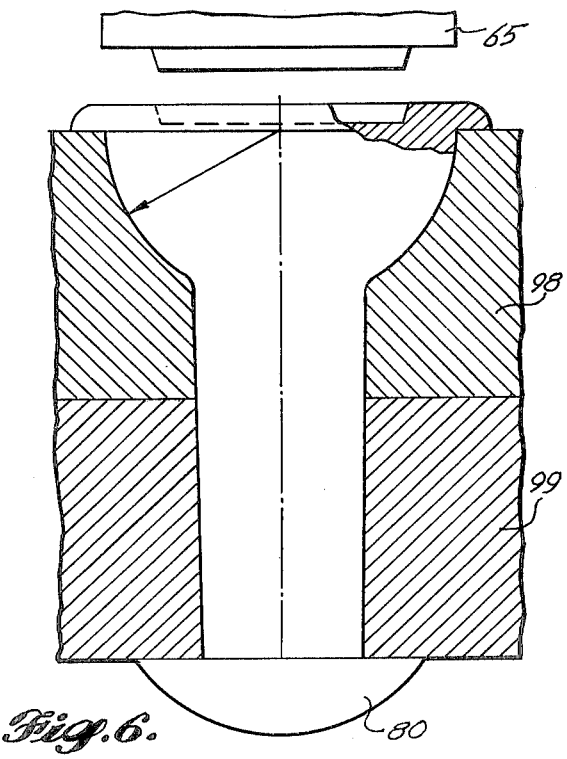
FIG. 6 shows a cross-section of a structural joint having the center of the upper portion of the generatrix for the countersink positioned at the surface of the workpiece.

In FIG. 6, the centers of circles utilized to form the upper portion of the generatrices of both the countersink and the rivet head are coincident at the upper surface of the rivet head. In this embodiment, equivalent interference will be encountered between the rivet head 71 and workpiece 70 along the entire surface of the countersink.

Other surfaces of rotation may be utilized to define the surfaces of the countersink and rivet head. Clearly, elliptical sections, hyperbolic sections and other smooth, curved segments may be used as generatrices for the fastener head and countersink, the prime requirement being that a smooth, curved surface is generated from the shank of the rivet to the top of the rivet head and from the bore to the surface of the workpiece.

Other configurations of this invention include fasteners and countersinks having the surfaces defined by rotation of curved lines about axes non-coincident with the axis of fastener pin and countersink.

A substantially cylindrical slug 72, shown in FIG. 4, may be used instead of the preformed rivet blank discussed above. In all instances the excess rivet material above the surface, as is best seen in FIGS. 3 and 6 may be removed to provide a smooth aerodynamic surface faired with the adjacent workpiece surface.

In FIG. 6a truncated conical tool is used as the driver for installation of the rivets. The truncated conical shape causes the peripheral surface areas of the rivet slug to fill the bore and countersink areas smoothly and completely while cold working the slug material and the adjacent workpiece.

The structure and process of this invention may advantageously be used, for example, in adhering the aerodynamic skin of an aircraft to the structural elements, for example, stringers or ribs.

It will be appreciated that the preferred embodiment of this invention has been illustrated and described as a riveting process and structure in which a rivet is formed into an aperture through workpieces which has a continuously curved countersink diverging outwardly from the bore of the aperture while presenting a smooth, substantially tangent juncture with the bore to form a convex surface which then forms a smooth juncture with another curved surface which is concave and which extends to the surface of the workpiece. While the preferred embodiment uses surfaces of revolution generated by rotation of a curved line formed of circular sgements about the axis of the aperture, other surfaces of revolution could equally well describe the contours of the countersink.

The embodiments of the invention in which an exclusive property or privelege is claimed are defined as follows:

1. A fastening system for joining workpieces with a rivet fastener comprising:
 a relatively nondeformable workpiece, said workpiece having an aperture formed therethrough, said aperture including a bore and having a countersink adjacent a first surface of said workpiece, said countersink comprising a continuously curved surface extending from said bore to said first surface, said countersink having a first and second portion, said first portion being adjacent said bore and diverging from said bore as it extends toward said first surface to provide resistance to pull-through of said rivet fastener, said second portion having decreasing divergency from said bore as it extends from said first portion to said first surface to provide a surface adapted for an interference fit with said rivet fastener; and
 a relatively deformable rivet fastener forcibly inserted into said aperture so as to deform said rivet fastener into intimate contact with said countersink thereby providing a structural, fluid-tight joint.

2. The fastening system of claim 1 wherein said rivet fastening fastener is formed prior to joining and has a head shaped to be substantially congruent to said countersink and aperture, but exceeding the dimensions thereof slightly.

3. The fastener system of claim 2 wherein said countersink and said head are surfaces of revolution.

4. The fastener system of claim 3 wherein said surface of revolution forming said countersink is generated by rotation of a generatrix comprising a continuously curved line about an axis coincident with the axis of said aperture.

5. The fastening system of claim 4 wherein said generatrix is formed by first and second circular segments, said first segment being a portion of a first circle having its center outside said bore and being tangent to said bore, said second segment being a portion of a second circle having a larger diameter than said first circle and having a point of tangency with said first circle and intersecting said first surface.

6. The fastening system of claim 5 wherein a line drawn tangent to each of said first and second circles at said point of tangency diverges from said axis of said aperture at an angle of about 41°.

7. The fastening system of claim 5 wherein said first cycle has a radius in the range of 0.05 to 0.2 times the diameter of said bore.

8. The fastening system of claim 5 where said second segment has a diameter in the range of 0.3 to 2.0 times the diameter of said bore.

* * * * *

UNITED STATES PATENT AND TRADEMARK OFFICE
CERTIFICATE OF CORRECTION

PATENT NO. : 4,245,921
DATED : January 20, 1981
INVENTOR(S) : Joseph G. Falcioni It is certified that error appears in the above-identified patent and that said Letters Patent are hereby corrected as shown below:

Column 3, line 32: "rivt" is changed to --rivet--.

Column 5, line 15: --In-- is inserted before "FIG. 3".

Column 5, line 27: "in" is changed to --In--.

Column 6, line 9: "6a" is changed to --6 a--.

Column 6, line 60: "fastener" is deleted.

Column 8, line 6: "cycle" is changed to --circle--.

Column 8, line 9: "segment" is changed to --circle--.

Signed and Sealed this

First Day of December 1981

[SEAL]

Attest:

GERALD J. MOSSINGHOFF

Attesting Officer  Commissioner of Patents and Trademarks